March 11, 1924.

J. H. REID 1,486,799

PROCESS OF GENERATING GAS

Filed March 25, 1920

Inventor
James Henry Reid,
By Hull, Smith, Brock & West
Attys.

Patented Mar. 11, 1924.

1,486,799

UNITED STATES PATENT OFFICE.

JAMES HENRY REID, OF READSBORO, VERMONT, ASSIGNOR TO INTERNATIONAL NITROGEN COMPANY, OF CLEVELAND, OHIO, A CORPORATION OF DELAWARE.

PROCESS OF GENERATING GAS.

Application filed March 25, 1920. Serial No. 368,496.

*To all whom it may concern:*

Be it known that I, JAMES HENRY REID, a citizen of the United States, residing at Readsboro, in the county of Bennington and State of Vermont, have invented a certain new and useful Improvement in Processes of Generating Gas, of which the following is a full, clear, and exact description, reference being had to the accompanying drawings.

This invention relates to a process of making gas and has for its general object to produce a maximum quantity of gas or gaseous mixture of a heating and illuminating value useful in the arts from a given quantity of distillable carbonaceous material, such as bituminous coal; also to produce a new gas or gaseous mixture possessing such values.

Figure 1:
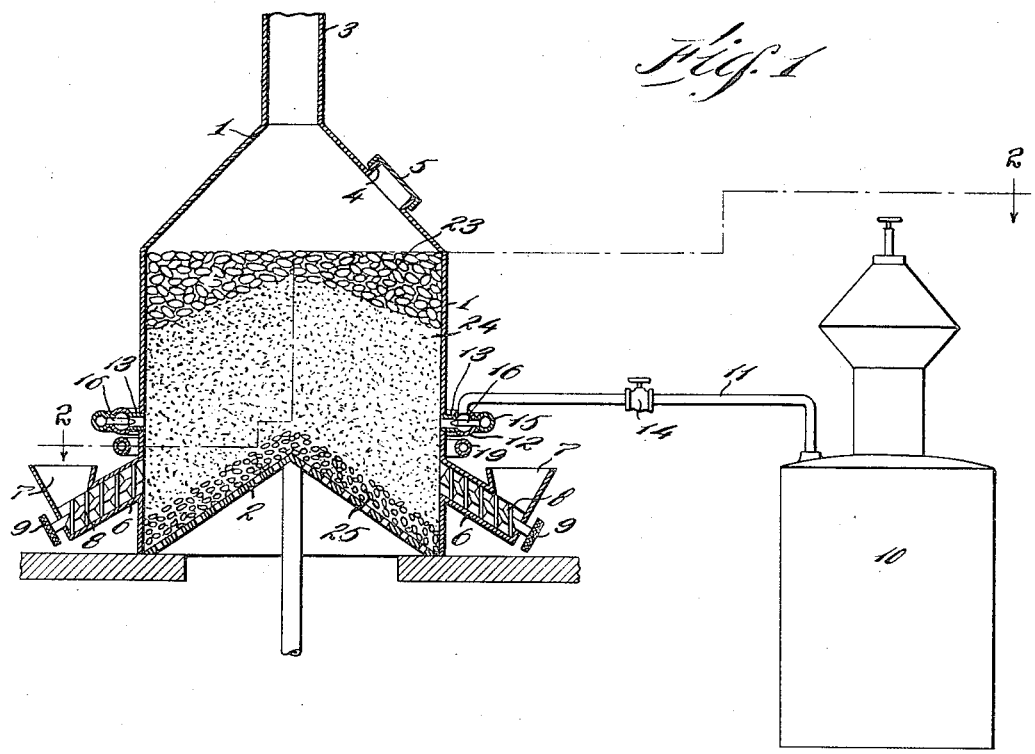
Figure 2:
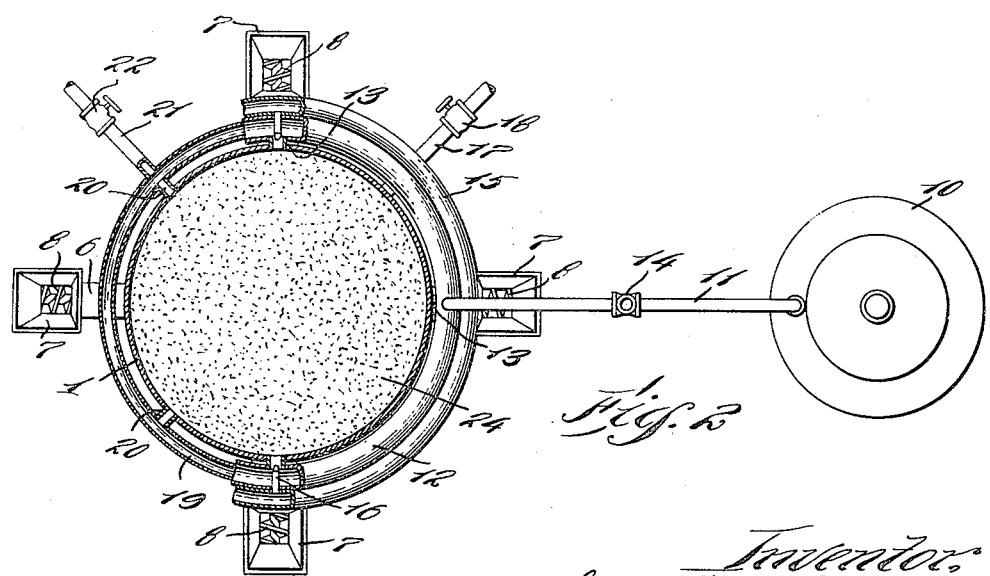

In the drawing forming part hereof, Fig. 1 represents a somewhat diagrammatical view, partly in section and partly in elevation, of an apparatus by means of which my process may be realized; and Fig. 2 represents a sectional plan view corresponding to the line 2—2 of Fig. 1.

Describing the various parts by reference characters, 1 denotes the shell or casing of a water-gas generator having in the bottom thereof a rotary conical grate 2 and provided at its top with a gas flue 3 and a filling connection 4 having a cover 5.

From the lower portion of the casing there projects a plurality of charging conduits 6 each having a hopper 7 and a screw conveyor 8 which may be driven by a pulley 9. The conduits extend downwardly from the casing 1 substantially parallel with the conical surface of the grate 2.

10 denotes a suitable source of supply for acetylene, which source may be a generator of any approved standard construction from which a pipe 11 leads to a hollow ring 12 surrounding the lower portion of the generator casing and communicating therewith at various points, as by short tubes 13. A valve 14 serves to control the flow of acetylene to said ring and thence to the lower portion of the generator casing.

Adjacent to the ring 12, and conveniently surrounding the same, is a hollow ring 15 provided with injector nozzles 16 which extend across the ring 12 and into the outer ends of the tubes 13. Communicating with the ring 15 is a pipe having a valve 18 and by means of which steam may be supplied at any desired pressure to said ring. Surrounding the casing 1 is a third ring 19 having short tubes 20 extending therefrom into the interior of the casing 1. This last mentioned ring is provided with a supply pipe 21 for air, said pipe having a valve 22.

In the practice of my process, the generator is first charged with coke through the connection 4, and this charge is kindled, supplying air through the tubes 20, if necessary, to facilitate the kindling operation. When the coke has become incandescent, acetylene may be injected into the glowing mass by means of the steam nozzles 16. The steam, passing through the incandescent coke, tends to produce water gas, but this reaction occurs in the presence of acetylene. As a result, a recombination is effected, producing a gas or gaseous mixture differing from either the water gas or the acetylene and possessing high illuminating and heat-unit values. Before the coke is completely consumed and while it is still in an incandescent condition, I introduce through one or more of the conduits 6, beneath the top of the coke, a mixture of finely divided distillable carbonaceous material with a finely divided substance capable of breaking up into gases the tarry and oily constituents of the carbonaceous material and of subsequently cooperating with the resultant coke for the joint production therewith of a gas containing hydrogen and carbon monoxide. In practice, I have used for the carbonaceous material bituminous coal reduced to a fineness of about eight mesh and for the cooperating substance calcium carbonate in the commercial form of limestone reduced to a fineness of about forty mesh. The intimate mixture of coal and limestone, in the proportion of approximately 60 to 40 parts by weight, respectively, is fed from the hoppers 8 into the producer above the grate 2 and, at the beginning of the operation, into the incandescent coke. As the operation proceeds, there will be a layer of glowing coke at the top of the producer and some ashes on the grate, the intervening space being occupied by the mixture of coal and limestone. In the drawing, the coke layer at the top is indicated at 23, the mixture of coal and limestone at 24, and the ashes at 25, on top of the grate. In the zone between the coke and ashes, the coal will be distilled, with the production of coke, and the gases thus obtained will be increased and enriched by the cracking into gases of the tarry and oily constituents of the coal contacting with the myriads of incandescent particles of limestone.

The limestone is not reduced to lime to any material extent during the distilling stage, owing to the reducing atmosphere in which the reaction occurs. After the conclusion of the distilling operation, acetylene will be injected by steam through the mass of incandescent material within the producer. The reaction between the steam and the glowing material tends to produce water gas, but this reaction occurs in the presence of acetylene and, as a result, the gases or gaseous mixture delivered through the flue 3 are different from the ordinary water gas and acetylene and possess high heating and illuminating values. The gases so produced will consist of carbon monoxide, hydrogen, and a proportion of olefiant gas due to the reaction between the acetylene and a part of the nascent hydrogen. The said gases or gaseous mixture may be conducted by the flue 3 to the hydraulic main, purifiers, scrubbers, enrichers and holders (not shown) with which gas plants are usually provided. Furthermore, the yield of gas is greater than obtainable heretofore by the distillation of an equal quantity of coal, while no tars or oils are collected in the gas main or in the hydraulic main.

If necessary, air will be admitted to the coal-limestone mixture from time to time in order to maintain the same at incandescence.

The mass of coke 23 serves as a filter by means of which dust is intercepted as the gases pass therethrough to the flue 3. If necessary, fresh coke, either cold or incandescent, may be introduced from time to time through the connection 4 in order to insure the presence of a mass sufficient for the purpose of intercepting the dust and of fully converting the partially formed gases contacting therewith.

Having thus described my invention, what I claim is:—

1. The process of making gas which comprises distilling a mixture of bituminous coal with calcium carbonate, supplying acetylene and steam to the incandescent residue, and conducting the evolved gases or gaseous mixture through a mass of incandescent carbonaceous material.

2. The process of making gas which comprises distilling a mixture of distillable carbonaceous material with a substance capable of converting the tarry and oily constituents of such material into gas and supplying acetylene and steam to the incandescent residue.

3. The process of making gas which comprises distilling a mixture of distillable carbonaceous material with a substance capable during such distillation of converting the tarry and oily constituents of such material into gas, and conducting through the incandescent residue acetylene and water.

4. The process of making gas which comprises distilling a mixture of distillable carbonaceous material with a substance capable of converting the tarry and oily constituents of such material into gas, supplying through the incandescent residue acetylene and steam, and conducting the evolved gases or gaseous mixture through a mass of incandescent material.

5. The process of producing gas which comprises distilling a mixture of bituminous coal and calcium carbonate, and subjecting the incandescent residue to the action of acetylene and water.

6. The process of making gas which comprises distilling a mixture of approximately 60 parts by weight of finely divided bituminous coal with approximately 40 parts by weight of calcium carbonate and subjecting the incandescent residue to the action of acetylene and steam.

7. The process of making gas which comprises distilling a mixture of distillable carbonaceous material with a substance capable of converting the tarry and oily constituents of such material into gas, and subjecting the incandescent residue to the action of acetylene and water.

8. The process of making gas which comprises distilling a mixture of approximately 60 parts by weight of finely divided bituminous coal with approximately 40 parts by weight of calcium carbonate, conducting through the incandescent residue acetylene and steam, and conducting the evolved gases or gaseous mixture through a mass of incandescent carbonaceous material.

In testimony whereof, I hereunto affix my signature.

JAMES HENRY REID.